United States Patent
Lu

(10) Patent No.: US 6,684,140 B2
(45) Date of Patent: Jan. 27, 2004

(54) SYSTEM FOR SENSING VEHICLE GLOBAL AND RELATIVE ATTITUDES USING SUSPENSION HEIGHT SENSORS

(75) Inventor: Jianbo Lu, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/174,736

(22) Filed: Jun. 19, 2002

(65) Prior Publication Data

US 2003/0236603 A1 Dec. 25, 2003

(51) Int. Cl.[7] ............................................. G06F 7/00
(52) U.S. Cl. ..................................... 701/37; 701/45
(58) Field of Search .......................... 701/37, 38, 45; 230/5.507, 5.514

(56) References Cited

U.S. PATENT DOCUMENTS

| | | |
|---|---|---|
| 4,690,553 A | 9/1987 | Fukamizu et al. |
| 4,765,649 A | 8/1988 | Ikemoto et al. |
| 4,827,416 A | 5/1989 | Kawagoe et al. |
| 4,888,696 A | 12/1989 | Akatsu et al. |
| 5,033,770 A | 7/1991 | Kamimura et al. |
| 5,058,017 A | 10/1991 | Adachi et al. |
| 5,066,041 A | 11/1991 | Kindermann et al. |
| 5,163,319 A | 11/1992 | Spies et al. |
| 5,208,749 A | 5/1993 | Adachi et al. |
| 5,228,757 A | 7/1993 | Ito et al. |
| 5,247,466 A | 9/1993 | Shimada et al. |
| 5,408,411 A | 4/1995 | Nakamura et al. |
| 5,500,798 A * | 3/1996 | Inagaki ..................... 701/37 |
| 5,598,335 A | 1/1997 | You |
| 5,703,776 A | 12/1997 | Soung |
| 5,732,377 A | 3/1998 | Eckert |
| 5,736,939 A | 4/1998 | Corcoran |
| 5,801,647 A | 9/1998 | Survo et al. |
| 5,809,434 A | 9/1998 | Ashrafi et al. |
| 5,925,083 A | 7/1999 | Ackermann |
| 5,944,392 A | 8/1999 | Tachihata et al. |
| 6,002,974 A | 12/1999 | Schiffmann |
| 6,002,975 A | 12/1999 | Schiffmann et al. |
| 6,038,495 A | 3/2000 | Schiffmann |
| 6,040,916 A | 3/2000 | Griesinger |
| 6,055,472 A | 4/2000 | Breunig et al. |
| 6,065,558 A | 5/2000 | Wielenga |
| 6,141,604 A | 10/2000 | Mattes et al. |
| 6,170,594 B1 * | 1/2001 | Gilbert ..................... 180/282 |
| 6,192,305 B1 | 2/2001 | Schiffmann |
| 6,202,020 B1 | 3/2001 | Kyrtsos |
| 6,233,510 B1 | 5/2001 | Platner et al. |
| 6,278,912 B1 * | 8/2001 | Amano ........................ 701/1 |
| 6,321,176 B1 * | 11/2001 | Mitsumoto ................. 702/151 |

FOREIGN PATENT DOCUMENTS

| | | |
|---|---|---|
| EP | 1 002 709 A3 | 5/2000 |
| EP | 1 002 709 A2 | 5/2000 |
| WO | WO 99/64262 | 12/1999 |

* cited by examiner

Primary Examiner—Michael J. Zanelli
(74) Attorney, Agent, or Firm—Artz & Artz; Gary A. Smith

(57) ABSTRACT

A control system (18) for an automotive vehicle includes a lateral acceleration sensor (32), a yaw rate sensor (28), a longitudinal acceleration sensor (36), and suspension height sensors (50a–50d). The controller (26) determines a roll characteristic from the first angular rate signal, the suspension height signal, and the lateral acceleration signal and a pitch characteristic from the first angular rate signal, the suspension height signal and the longitudinal acceleration signal.

31 Claims, 3 Drawing Sheets

SYSTEM FOR SENSING VEHICLE GLOBAL AND RELATIVE ATTITUDES USING SUSPENSION HEIGHT SENSORS

TECHNICAL FIELD

The present invention relates generally to a control apparatus for controlling a system of an automotive vehicle in response to sensed dynamic behavior, and more specifically, to a method and apparatus for controlling the system of the vehicle by determining attitude of the vehicle using suspension height sensors.

BACKGROUND

In modern vehicle control systems for automotive vehicles, the vehicle attitude control systems directly influence the comfort, handling and safety of the vehicle. For example, the ride comfort of a vehicle requires regulating the dynamic variation of the vehicle body pitch and roll attitudes; the rollover prevention (active safety) requires regulating the roll attitude between the vehicle car body and the average road surface; the air bag requires determining both the vehicle global roll attitude and its velocity before it is deployed; an active anti-roll-bar may be activated based on the vehicle roll attitude; vehicle pitch attitude may be used to predict vehicle load transfer between front axle and rear axle. The control system uses the available actuators to alter actual vehicle attitude based on the sensed or predicted vehicle body attitudes.

Two types of vehicle attitudes must be distinguished. One is the global attitude, which is relative to an earth frame (also called the inertial frame), sea level, or a flat and horizontal road. The global attitude can be directly related to measurements taken by inertial acceleration sensors or GPS-based angular rate sensors. The other is the relative attitude, which defines the angular positions of the vehicle with respect to the road surface on which the vehicle is driven. Since the relative attitude of the vehicle must be measured with respect to the road surface on which the vehicle rests at any given moment, the angle and slope of which is continuously changing, relative attitude can not be directly related to the output of inertial or GPS-type acceleration sensors.

In order to successfully achieve the desired vehicle attitude control goal as mentioned before, predicting the aforementioned relative and global attitudes with high accuracy from available sensor signals is of great importance.

A vehicle attitude sensing method has been proposed in U.S. Pat. No. 5,408,411. In that patent, a sensor module using six linear acceleration sensors is mounted on the vehicle to get vehicular attitude information. Although this method is able to sense vehicle attitude, the sensor set is believed to provide little advantage in terms of performance and cost.

It would therefore be desirable to provide an attitude control system to predict attitude angle for vehicle dynamics control that includes the interdependency among the roll, pitch, and yaw motions while compensating for long term maneuvers.

SUMMARY OF THE INVENTION

The present invention is particularly suited for an automotive vehicle equipped with a yaw stability control system and a controllable suspension system. The sensor set used in a yaw stability control system typically includes vehicle lateral and longitudinal acceleration sensors, and a yaw rate sensor. The controllable suspension system used here is equipped with four suspension height sensors mounted at the four corners of the vehicle. The yaw stability control system aims to prevent a vehicle from spinning-out during driving, and to regulate the vehicle side-slip angle (which could be thought of as a relative yaw attitude with respect to the desired course of the vehicle). The controlled suspension systems aims to improve vehicle ride comfort and provide a leveling function. The suspension height sensors are used to provide feedback signals so that vehicle leveling and suspension controlling may be performed. The present invention employs the suspension height sensors to obtain the pitch and roll characteristics of the vehicle. That is, the present invention senses vehicular relative attitude with respect to the average road surface of various terrains, and vehicular absolute attitude with respect to the sea level for vehicular attitude control applications. Advantageously, the system can be used for roll stability control, controllable suspensions, active anti-roll-bars, and other vehicle dynamics control systems.

In one aspect of the invention, a control system for an automotive vehicle includes a lateral acceleration sensor, a yaw rate sensor, four suspension height sensors generating four suspension height signals, and a longitudinal acceleration sensor. The controller determines a roll characteristic from the suspension height signals, the lateral acceleration signal and a pitch characteristic from the four suspension height signals and the longitudinal acceleration signal.

In a further aspect of the invention, a method of controlling a safety device for an automotive vehicle having a body comprises measuring a lateral acceleration of the vehicle body; measuring a longitudinal acceleration of the vehicle body; measuring a yaw rate of the vehicle body; measuring four suspension height signals corresponding to the four suspension heights of the four corners of the vehicle; determining a roll angular rate of the vehicle body from the suspension height signals and the lateral acceleration signal; determining a pitch angular rate of the vehicle body from the suspension height signals and the longitudinal acceleration signal; determining the global roll and pitch attitude angles based on the predicted roll and pitch angular rate signals; determining the relative roll and the pitch attitude angle of the vehicle body with respect to the average road surface based on the four suspension height signals; and activating a safety device in response to the estimated relative roll angle, the estimated relative pitch angle, the estimated global roll and estimated global pitch angle.

The present invention aims to estimate and predict the vehicular attitude used in vehicle attitude control systems such as a controllable suspension system, a roll stability control system, a yaw stability control system, an active anti-roll-bar system and other vehicle dynamics control systems. The estimated and predicted variables are used for setting the feedback control action flag and as the feedback signals to construct the desired control command to activate the actuators.

Other advantages and features of the present invention will become apparent when viewed in light of the detailed description of the preferred embodiment when taken in conjunction with the attached drawings and appended claims.

DESCRIPTION OF THE PREFERRED EMBODIMENT

Figure 1:
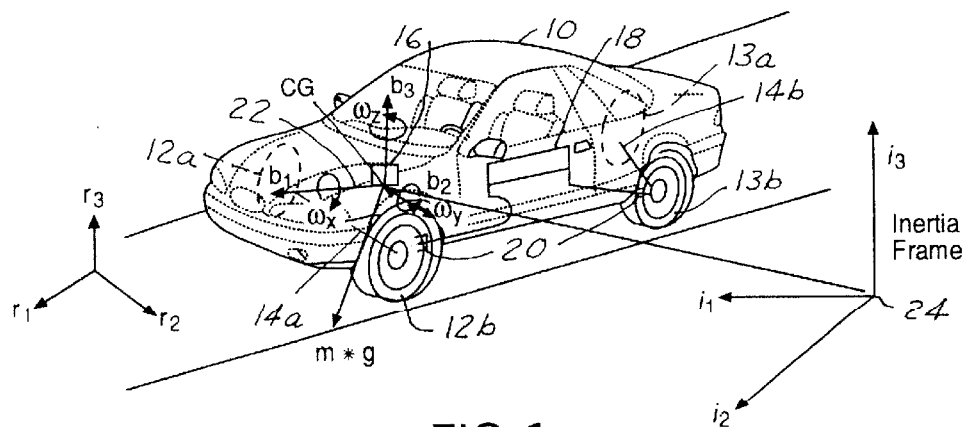
FIG. 1 is a diagrammatic view of a vehicle with variable vectors and coordinator frames according to the present invention.

In the following figures the same reference numerals will be used to identify the same components. The present invention aims to estimate and predict the vehicular attitude used in vehicle attitude control systems such as a controllable suspension system, a roll stability control system, a yaw stability control system, an active anti-roll-bar system and other vehicle dynamics control systems. The estimated and predicted variables are used for setting the feedback control action flag and as the feedback signals to construct the desired control command to activate the actuators.

Referring to FIG. 1, an automotive vehicle 10 with a safety system of the present invention is illustrated with the various forces and moments thereon during a rollover condition. Vehicle 10 has front right and front left tires 12a, 12b and rear right and left rear tires 13a, 13b, respectively. The vehicle 10 may also have a number of different types of front steering systems 14a and rear steering systems 14b including each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa. Generally, the vehicle has a weight represented as Mg at the center of gravity of the vehicle, where g=9.8 m/s² and M is the total mass of the vehicle.

As mentioned above, the system may also be used with active/semi-active suspension systems, anti-roll bar or other safety devices deployed or activated upon sensing predetermined dynamic conditions of the vehicle.

The sensing system 16 is coupled to a control system 18. The sensing system 16 preferably uses a standard yaw stability control sensor set (including lateral acceleration sensor, yaw rate sensor, steering angle sensor and wheel speed sensor) together with a longitudinal acceleration sensor. The various sensors will be further described below. The wheel speed sensors 20 are mounted at each corner of the vehicle, and the rest of the sensors of sensing system 16 are preferably mounted directly on the center of gravity of the vehicle body, along the directions x,y and z shown in FIG. 1. As those skilled in the art will recognize, the frame from $b_1$, $b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate and $\omega_z$ for the yaw rate. The present invention calculations preferably take place in an inertial frame 24 that may be derived from the body frame 22 as described below.

The yaw rate sensor is used, and roll rate and pitch rate sensors are not necessary for the current system. However, they may be used as a check in a commercial embodiment. The angular rate sensor and the acceleration sensors are mounted on the vehicle car body along the body frame directions $b_1$, $b_2$ and $b_3$, which are the x-y-z axes of the vehicle's sprung mass.

The longitudinal acceleration sensor is mounted on the car body located at the center of gravity, with its sensing direction along $b_1$-axis, whose output is denoted as $a_x$. The lateral acceleration sensor is mounted on the car body located at the center of gravity, with its sensing direction along $b_2$-axis, whose output is denoted as $a_y$.

The other frame used in the following discussion includes the road frame, as depicted in FIG. 1. The road frame system $r_1 r_2 r_3$ is fixed on the driven road surface, where the $r_3$ axis is along the average road normal direction computed from the normal directions of the four tire/road contact patches.

In the following discussion, the Euler angles of the body frame with respect to the road frame $r_1 r_2 r_3$ are denoted as $\theta_{xbr}$, $\theta_{ybr}$ and $\theta_{zbr}$, which are also called the relative Euler angles.

The present $b_1 b_2 b_3$ invention estimates the relative Euler angles $\theta_{zbr}$ and $\theta_{ybr}$ based on the available sensor signals and the signals calculated from the measured values.

Figure 2:
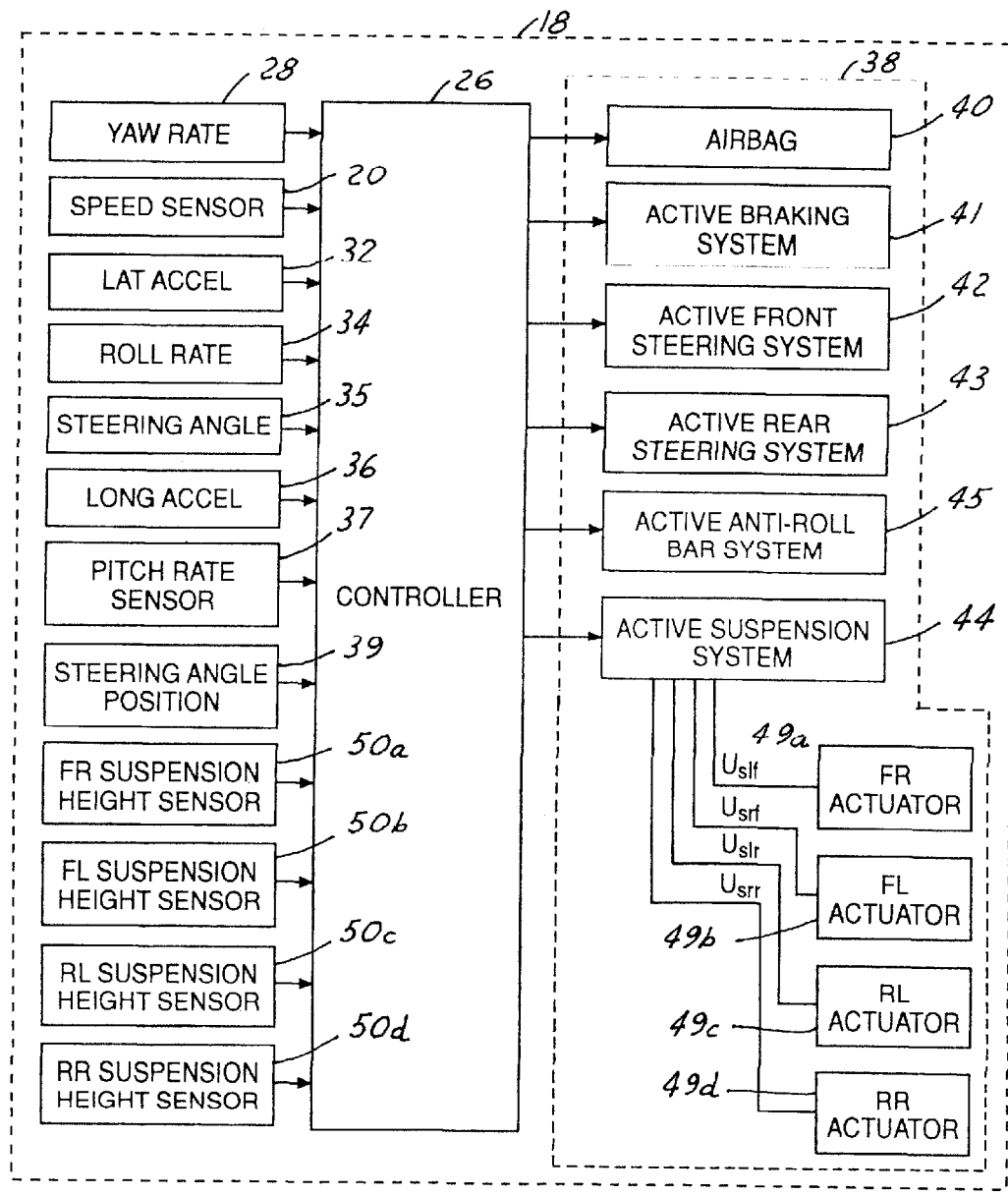
FIG. 2 is a block diagram of a stability system according to the present invention.

Referring now to FIG. 2, control system 18 is illustrated in further detail having a controller 26 used for receiving information from a number of sensors which may include a yaw rate sensor 28, a speed sensor 20, a lateral acceleration sensor 32, a steering angle sensor 35, a longitudinal acceleration sensor 36, steering angle position sensor 39 and suspension height sensors 50a, 50b, 50c, and 50d. Notice that roll rate sensor 34 and pitch rate 37 are not necessary for the current system, since those signals will be estimated from the suspension height sensor signals and the longitudinal and lateral acceleration sensor signals.

In the preferred embodiment the sensors are located at the center of gravity of the vehicle. Those skilled in the art will recognize that the sensor may also be located off the center of gravity and translated equivalently thereto.

Lateral acceleration, roll orientation and speed may be obtained using a global positioning system (GPS). Based upon inputs from the sensors, controller 26 may control a safety device 38. Depending on the desired sensitivity of the system and various other factors, not all the sensors 28–39 may be used in a commercial embodiment. Safety device 38 may include an airbag 40, an active braking system 41, an active front steering system 42, an active rear steering system 43, an active suspension system 44, and an active anti-roll bar system 45, or combinations thereof. Each of the systems 40–44 may have their own controllers for activating each one. Also, other vehicle components such as a active suspension system 44 may be used to adjust the suspension to improve roll stability. As mentioned above, the safety system 38 is preferably at least the active braking system 41.

Active suspension system 44 may be used to adjust the suspension to prevent rollover. Each corner of the vehicle may have an independently controllable actuator (front right 49a, front left 49b, rear left 49c, and rear right 49d) that is used to raise or lower the relative height in response to height sensors 50a, 50b, 50c, and 50d located at respective corners and coupled to controller 26. As will be described below, height sensors 50a–50d measure the distance between or the change in distance between the vehicle body and the wheel. The height sensors may also function by sensing the force or torque associated with the loading condition of one or more suspension or chassis components including a pressure transducer in an active air suspension, a shock absorber sensor such as a load cell, a strain gauge, the steering system absolute or relative motor load, the steering system pressure of the hydraulic lines, a tire lateral force sensor or sensors, a longitudinal tire force sensor, a vertical tire force sensor or a tire sidewall torsion sensor.

Roll rate sensor 34 and pitch rate sensor 37 may sense the roll condition of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 and pitch rate sensor 37 may also sense the roll condition based on sensing the linear or rotational relative displacement or displacement velocity of one or more of the suspension chassis components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an optical-based speed sensor.

Based on the inputs from sensors 28 through 39, controller 26 determines a roll condition and controls any one or more of the safety devices 40–45.

Speed sensor 20 may be one of a variety of speed sensors known to those skilled in the art. For example, a suitable speed sensor may include a sensor at every wheel that is averaged by controller 26. Preferably, the controller translates the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. For example, if speed is determined while speeding up or braking around a corner, the lowest or highest wheel speed may not be used because of its error.

Global Attitude Sensing $F_{slf}$, $F_{srf}$, $F_{slr}$, $F_{srr}$ are the vertical forces developed at the four suspensions at the four corners of the vehicle 10. $F_{slf}$, $F_{srf}$, $F_{slr}$, $F_{srr}$ may be computed from the outputs of suspension height sensors 50a–50d as $s^{lf}$, $s_{rf}$, $S_{rr}$ (which measure the relative displacements between the vehicle body and the wheel at the left-front, right-front, left-rear and right-rear corners), the suspension parameters and characteristics, and the control command $u_{slf}$, $u_{srf}$, $u_{slr}$, $u_{srr}$ used for controllable suspensions shown in FIG. 2. If a look-up table within active suspension system 44 for the controllable suspension characteristics is available, then the total suspension forces may be computed as $$F_{lf} = \text{lookup\_table}_1(s_{lf}, \dot{s}_{lf}, u_{lf})$$

$$F_{rf} = \text{lookup\_table}_2(s_{rf}, \dot{s}_{rf}, u_{rf})$$

$$F_{lr} = \text{lookup\_table}_3(s_{lr}, \dot{s}_{lr}, u_{lr})$$

$$F_{rr} = \text{lookup\_table}_4(s_{rr}, \dot{s}_{rr}, u_{rr}) \quad (1)$$

Notice that the involved look-up tables have three inputs: the suspension height, the suspension height velocity and the suspension active or semi-active control command. The forces may also be expressed as the passive suspension forces plus the active or semi-active suspension forces as in the following $$F_{lf} = K_f s_{lf} + D_f \dot{s}_{lf} + f_{lf}(s_{lf}, \dot{s}_{lf}, u_{lf})$$

$$F_{rf} = K_f s_{rf} + D_f \dot{s}_{rf} + f_{rf}(s_{rf}, \dot{s}_{rf}, u_{rf})$$

$$F_{lr} = K_r s_{lr} + D_r \dot{s}_{lr} + f_{lr}(s_{lr}, \dot{s}_{lr}, u_{lr})$$

$$F_{rr} = K_r s_{rr} + D_r \dot{s}_{rr} + f_{rr}(s_{rr}, \dot{s}_{rr}, u_{rr}) \quad (2)$$

where $K_f$ and $K_r$ are the front and rear $D_r$, $D_f$ passive suspension spring rates with the units of Newtons per meter. Notice that $K_f$ and $K_r$ may be functions of the suspension stoke instead of constant values to reflect the non-linearity of the passive suspension spring rate. The same are true for the suspension damping rate $D_f$ and $D_r$.

There are torques along the roll direction generated from anti-roll-bar. If denote those torques as $\tau_{arf}$, $\tau_{arr}$, which are applied to the vehicle, may be expressed as the following $$\tau_{arf} = K_{arf} \frac{(s_{lf} - s_{rf})}{l} \quad (3)$$

$$\tau_{arr} = K_{arr} \frac{(s_{lr} - s_{rr})}{l}$$

with $K_{arf}$ and $K_{arr}$ being the stiffnesses for the front and the rear anti-roll bar, with unit Nm/rad.

If the vehicle body is separated from the suspension around the top ends of the suspensions, there are longitudinal and lateral forces applied to the vehicle body from the suspensions. The total forces are applied to the vehicle body along the body longitudinal direction as $F_x$, the total force applied to the vehicle body from the suspensions along the body lateral direction is $F_y$. $F_x$ and $F_y$ are applied on the bottom of the car body where the suspensions intersect with the vehicle body. Notice that both $F_x$ and $F_y$ can be calculated based on the measured accelerations $$F_y = M_s a_y$$

$$F_x = M_s a_x \quad (4)$$

where $M_s$ is the vehicle sprung mass or the vehicle body mass.

The roll and pitch angular rates of the vehicle body are denoted as $\omega_x$ and $\omega_y$, and they are not measured but estimated from the measured signals in our system. The following will provide a method to do this. By using the forces computed in Equations (1), (2) or (3) and (4), and Newton's laws, the following dynamic relationships which are obeyed by the vehicle body around its center of gravity may be developed for the unknowns $\omega_x$ and $\omega_y$ $$I_x \dot{\omega}_x = h \sum_{i=1}^{4} F_{yi} + l(F_{slf} - F_{srf} + F_{slr} - F_{srr}) + \tau_{arf} + \tau_{arr} \quad (5)$$

$$I_y \dot{\omega}_y = h \sum_{i=1}^{4} F_{xi} + t_f F_{slf} + t_f F_{srf} - t_r F_{slr} - t_r F_{srr}$$

where $I_x$ and $I_y$ are the momentum of inertia of the car body with respect to the x and y axis respectively; $M_s$ is the sprung mass (the mass of the car body); $t_f$ and $t_r$ are the distances from the center of gravity of the car body to the front and rear axles; h is the distance between center of gravity of the car body and the bottom of the vehicle body.

From Equation (5) the angular roll and pitch accelerations may be calculated from the suspension height sensor and the longitudinal and lateral accelerations $$\dot{\omega}_x = f_x(F_{slf}, F_{srf}, F_{slr}, F_{srr}, F_{arf}, F_{arr}, a_x)$$

$$\dot{\omega}_y = f_y(F_{slf}, F_{srf}, F_{slr}, F_{srr}, a_y) \quad (6)$$

Hence the vehicle roll rate and pitch rate can be calculated through integrations of the angular accelerations from Equation (6).

In order to eliminate the potential low frequency drift, a digital integration with high-pass filters is used to obtain the digital values of $\hat{\omega}_x(k)$ and $\hat{\omega}_y(k)$ at the kth time instant, which can be summarized as the following $$\hat{\omega}_x(k+1) = \alpha \hat{\omega}_x(k) + f_x(k+1)\Delta T$$

$$\hat{\omega}_y(k+1) = \beta \hat{\omega}_y(k) + f_y(k+1)\Delta T$$

where $\Delta T$ is the sampling time, $\alpha$ and $\beta$ are two coefficients with magnitude less than 1 and $$f_x(k) = f_x(F_{slf}(k), F_{srf}(k), F_{slr}(k), F_{srr}(k), F_{arf}(k), F_{arr}(k), a_x(k))$$

$$f_y(k) = f_y(F_{slf}(k), F_{srf}(k), F_{slr}(k), F_{srr}(k), a_y(k))$$

Through the Euler transformation, the vehicle global roll and pitch angles can be related to the estimated roll rate $\hat{\omega}_x$ and the estimated pitch rate $\hat{\omega}_y$ from the following nonlinear differential equations.

$$\dot{\theta}_x = \hat{\omega}_x + [\hat{\omega}_y \sin(\theta_x) + \omega_z \cos(\theta_x)]\tan(\theta_y)$$

$$\dot{\theta}_y = \hat{\omega}_y \cos(\theta_x) - \omega_z \sin(\theta_x) \quad (7)$$

A digital computation of the above angles through a high-pass integration can be obtained as in the following based on the past value of the roll and pitch angles $$\theta_x(k+1) = \chi \theta_x(k) + g_x(k+1)\Delta T$$

$$\theta_y(k+1) = \delta \theta_y(k) + g_y(k+1)\Delta T$$

where $$g_x(k+1) = \hat{\omega}_x(k+1) + [\hat{\omega}_y(k+1)\sin(\theta_x(k)) + \omega_z(k+1)\cos(\theta_x(k))]\tan(\theta_y(k))$$

$$g_y(k+1) = \hat{\omega}_y(k+1)\cos(\theta_x(k)) - \omega_z(k+1)\sin(\theta_x(k))$$

and the coefficients $\chi$ and $\delta$ are chosen based on specific application requirements.

Relative Attitude Sensing

Consider a vector with x-y-z coordinates as $x_b, y_b, z_b$ of its end point in the body frame. The z-coordinate of the end point of the same vector measured in the road frame can be computed from the Euler transformation $$z_r = -x_b \sin(\theta_{yr}) + y_b \sin(\theta_{xr})\cos(\theta_{yr}) + z_b \cos(\theta_{xr})\cos(\theta_{yr}) \quad (8)$$

Let l be the half of the wheel track; $t_f$ and $t_r$ be the distances from the center of gravity of the car body to the front and rear axles; h be the distance between the bottom of the vehicle body and the center of gravity of the vehicle along the body z-axis. Then, in the body frame, the four corners of the vehicle body where suspensions are connected with the wheel have the following coordinates LF Corner: $x = t_f, y = l, z = -h$ RF Corner: $x = t_f, y = -l, z = -h$ LR Corner: $x = -t_r, y = l, z = -h$ RR Corner: $x = -t_r, y = l, z = -h$ \quad (9)

Let $z_{lf}, z_{rf}, z_{lr}$ and $z_{rr}$ be the relative displacement of the vehicle corners at the left-front, right-front, left-rear and right-rear locations, which are measured along the direction perpendicular to the road surface. By using the transformation in Equation (8), those corner displacements relative to the road surface can be expressed as the function of the relative angle roll angle $\theta_{xr}$ and the relative pitch angle $\theta_{yr}$ $$z_{lf} = -t_f \sin(\theta_{yr}) + l \sin(\theta_{xr})\cos(\theta_{yr}) + (z_{cR} - h)\cos(\theta_{xr})\cos(\theta_{yr})$$

$$z_{rf} = -t_f \sin(\theta_{yr}) - l \sin(\theta_{xr})\cos(\theta_{yr}) + (z_{cR} - h)\cos(\theta_{xr})\cos(\theta_{yr})$$

$$z_{lr} = -t_r \sin(\theta_{yr}) + l \sin(\theta_{xr})\cos(\theta_{yr}) + (z_{cR} - h)\cos(\theta_{xr})\cos(\theta_{yr})$$

$$z_{rr} = -t_r \sin(\theta_{yr}) - l \sin(\theta_{xr})\cos(\theta_{yr}) + (z_{cR} - h)\cos(\theta_{xr})\cos(\theta_{yr}) \quad (10)$$

where $z_{cR}$ is the relative displacement of the center of gravity of the vehicle with respect to the road surface, but measured along the body z-axis. By eliminating $z_{cR}$ in Equations (10), the following expression for $\theta_{xr}$ and $\theta_{yr}$ using $z_{lf}, z_{rf}, z_{lr}, z_{rr}$ may be obtained;

$$\theta_{yr} = \sin^{-1}\left\{\frac{z_{lf} + z_{rf} - z_{lr} - z_{rr}}{2(t_f + t_r)}\right\} \quad (11)$$

$$\theta_{xr} = \sin^{-1}\left\{\frac{z_{lf} - z_{rf} + z_{lr} - z_{rr}}{4l\cos(\theta_{yr})}\right\}.$$

Figure 3:
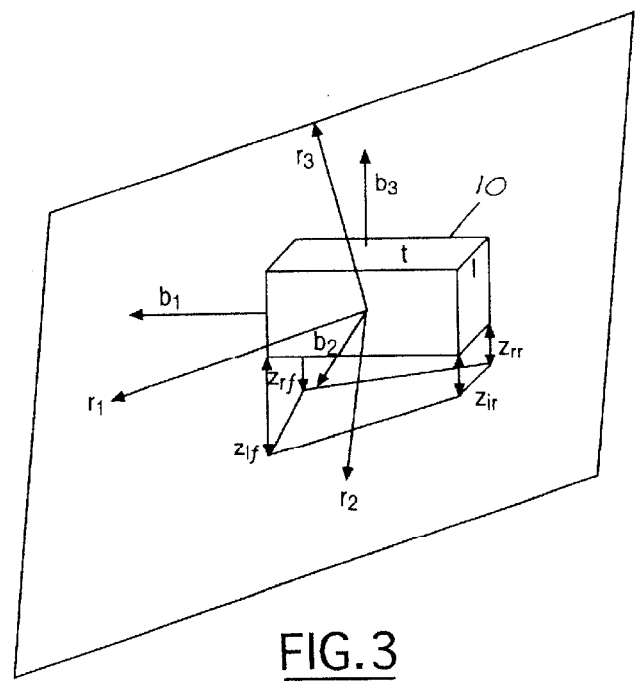
FIG. 3 is a diagrammatic view showing the displacement (relative to road surface) of the four corners of the vehicle body along the body-fixed vertical axis.
Figure 4:
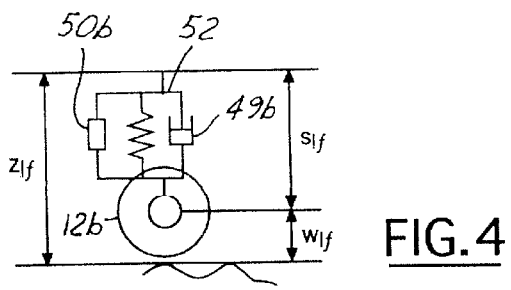
FIG. 4 is a diagrammatic view showing the two components of the relative corner displacement depicted in FIG. 3.

Since $z_{lf}, z_{rf}, z_{lr}, z_{rr}$ are not directly measured, sensor signals may be used to estimate them. As shown in FIGS. 3 and 4, $z_{lf}$ can be further expressed as the sum of the two parts: the suspension stroke $s_{lf}$ which is measured by the suspension height sensors 50b and the wheel displacement $w_{lf}$ with respect to the road surface along the direction perpendicular to the road surface. The same is true for the rest of the corner locations. The four height sensor signals may be denoted as $s_{lf}, s_{rf}, s_{lr}$ and $s_{rr}$, and the four wheel vertical motion as $w_{lf}, w_{rf}, w_{lr}$ and $w_{rr}$, $$s_{lf} = z_{lf} - w_{lf}$$

$$s_{rf} = z_{rf} - w_{rf}$$

$$s_{lr} = z_{lr} - w_{lr}$$

$$s_{rr} = z_{rr} - w_{rr} \quad (12)$$

The relative roll angle and relative pitch angle (attitude) can be broken into pieces according to the suspension motion and the wheel vertical motion. The roll and the pitch attitude due to suspension motions $s_{lf}, s_{rf}, s_{lr}$ and $s_{rr}$ as may be defined as $$\theta_{yr-susp} = \sin^{-1}\left\{\frac{s_{lf} + s_{rf} - s_{lr} - s_{rr}}{2(t_f + t_r)}\right\} \quad (13)$$

$$\theta_{xr-susp} = \sin^{-1}\left\{\frac{s_{lf} - s_{rf} + s_{lr} - s_{rr}}{4l\cos(\theta_{yr})}\right\}$$

and the roll and pitch contributions due to the wheel vertical motion as $$\theta_{yr-whl} = \sin^{-1}\left\{\frac{w_{lf} + w_{rf} - w_{lr} - w_{rr}}{2(t_f + t_r)}\right\} \quad (14)$$

$$\theta_{xr-whl} = \sin^{-1}\left\{\frac{w_{lf} - w_{rf} + w_{lr} - w_{rr}}{4l\cos(\theta_{yr})}\right\}$$

Then $$\theta_{yr} \approx \theta_{yr-susp} + \theta_{yr-whl}$$

$$\theta_{xr} \approx \theta_{xr-susp} + \theta_{xr-whl} \quad (15)$$

Notice that if the vehicle has all four wheels in contact with the road surface, then $w_{lf}$, $w_{rf}$, $w_{lr}$ and $w_{rr}$ are equal to the rolling radius of each wheel plus the corresponding tire deflection. Since the tire deflections are usually very small, and the rolling radii have small deference among the four wheels, the following is approximately true $$\theta_{yr} \approx \theta_{yr-susp}$$

$$\theta_{xr} \approx \theta_{xr-susp} \quad (16)$$

Road Bank and Slope Estimation

The road bank angle now can be calculated as the following through the estimated global roll angle and relative roll angle $$\text{Road Bank} = \theta_x - \theta_{xr} \quad (17)$$

The road slope angle can be similarly calculated through the calculated global pitch angle and relative pitch angle as $$\text{Road Slope} = \theta_y - \theta_{yr} \quad (18)$$

Figure 5:
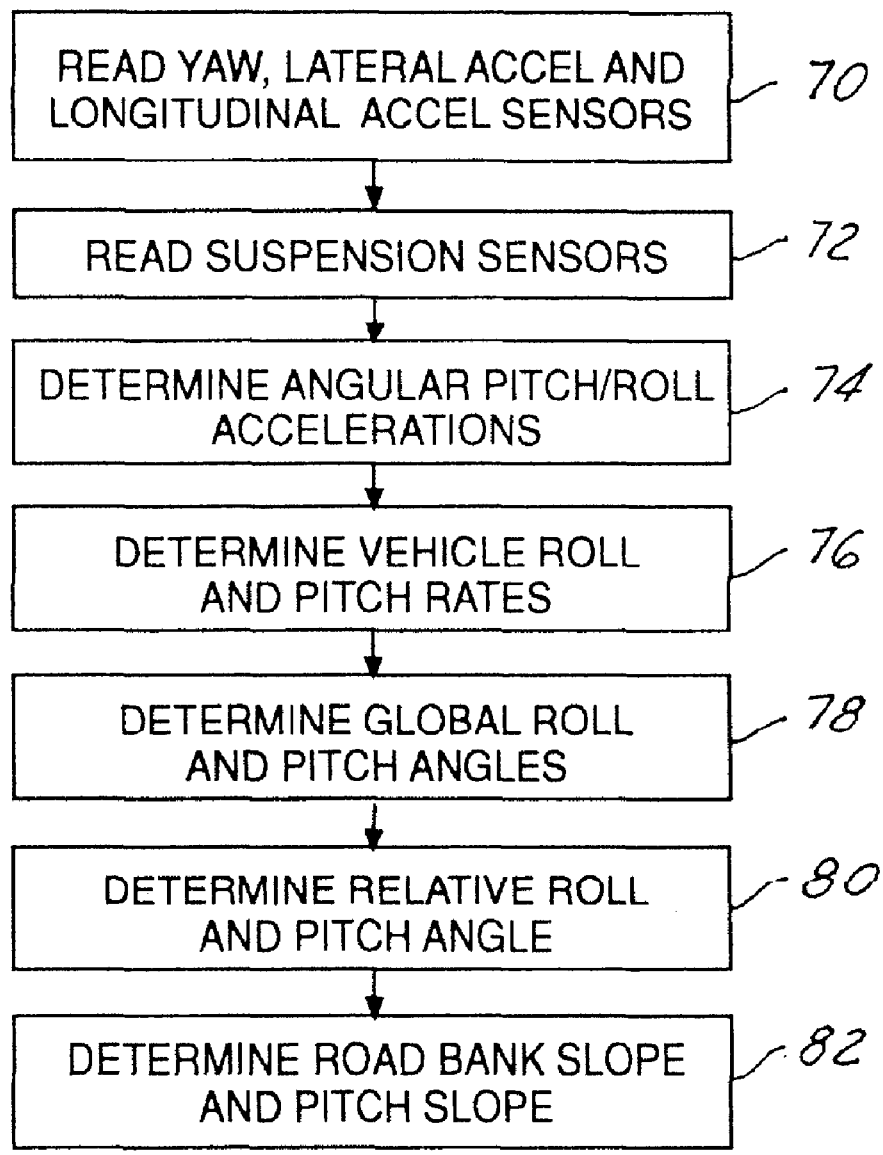
FIG. 5 is flow chart of determination according to the present invention.

Referring now to FIG. 5, a summary of the above process is illustrated. In step 70, the various yaw, lateral acceleration and longitudinal acceleration sensors from the vehicle yaw stability control system and/or the roll stability control system are read. In step 72 the suspension height sensors are read to determine four suspension heights. In step 74 the angular pitch and roll accelerations are determined from the lateral acceleration, the longitudinal acceleration, and the suspension height sensors. In step 76 the vehicle roll and pitch rates are determined from the pitch and roll acceleration using various integration schemes including a high-pass-filtered integration, anti-drift integration or together with a steady state recovery filtering. In step 78 the global roll and global pitch angles are determined using the yaw rate from step 70 and the vehicle roll and pitch rates from step 76. In step 80, the relative roll and pitch angles are determined as a function of the suspension heights as described above in Equation (11). In step 82, the global roll and pitch angles and the relative roll and pitch angles are used to determine the road bank slope and pitch slope. The road bank slope and road pitch slope are used to further set the control thresholds for the yaw or roll stability control system.

The various control systems of the vehicle may use one or several of the pitch or roll characteristics determined above in step 74, 76, 78, or 82. One or more of the systems may then be activated based upon these characteristics.

While particular embodiments of the invention have been shown and described, numerous variations and alternate embodiments will occur to those skilled in the art. Accordingly, it is intended that the invention be limited only in terms of the appended claims.

What is claimed is:

1. A control system for an automotive vehicle having a vehicle body comprising:
   a first angular rate sensor generating a first angular rate signal corresponding to a first angular motion of the vehicle body;
   a suspension height sensor generating a suspension height signal corresponding to the suspension height of the vehicle;
   a lateral acceleration sensor generating a lateral acceleration signal corresponding to a lateral acceleration of the vehicle body;
   a longitudinal acceleration sensor generating a longitudinal acceleration signal corresponding to the longitudinal acceleration of the vehicle body; and
   a controller coupled to said first angular rate sensor, said suspension height sensor, said lateral acceleration sensor, and said longitudinal acceleration sensor, said controller determining a roll characteristic from the first angular rate signal, the suspension height signal, and the lateral acceleration signal and a pitch characteristic from the first angular rate signal, the suspension height signal and the longitudinal acceleration signal.

2. A control system as recited in claim 1 wherein the roll characteristic comprises one of a roll angular acceleration, global roll attitude, vehicle relative roll attitude and road surface bank.

3. A control system as recited in claim 1 wherein the pitch characteristic comprises one of a pitch angular acceleration, global pitch attitude, vehicle relative pitch attitude and road surface slope.

4. A system as recited in claim 1 wherein said first angular rate sensor is one selected from the group of a yaw rate sensor, a pitch rate sensor and a roll rate sensor.

5. A system as recited in claim 1 wherein said suspension height sensor comprises four suspension height sensors generating four suspension height signals, said controller determining a roll characteristic in response to the four suspension height signals.

6. A control system for an automotive vehicle having a vehicle body comprising:
   a suspension height sensor generating a suspension height signal corresponding to the suspension height of the vehicle;
   a lateral acceleration sensor generating a lateral acceleration signal corresponding to a lateral acceleration of the vehicle body; and
   a controller coupled to said suspension height, and said lateral acceleration sensor, said controller determining a suspension force in response to said suspension height signal and a control command, said controller determining a roll angular acceleration from the suspension height signal and the lateral acceleration signal.

7. A system as recited in claim 6 wherein said controller determines a suspension velocity signal from said suspension height signal, said controller determining a suspension force in response to said suspension height signal, said suspension velocity signal and a control command.

8. A system as recited in claim 6 further comprising a yaw rate sensor generating a yaw rate signal corresponding to a yaw angular motion of the vehicle body.

9. A system as recited in claim 8 wherein said controller determines a global roll attitude from the roll angular acceleration, the yaw rate signal, and a global pitch attitude.

10. A system as recited in claim 6 wherein the controller determines a relative roll attitude in response to said suspension height signal and wherein said controller determines a global roll attitude from the roll angular acceleration, a yaw rate signal, and a global pitch attitude wherein the controller determines a road bank angle in response to the global roll attitude and the relative roll attitude.

11. A system as recited in claim 8 wherein said controller determines a global roll attitude from the roll angular acceleration, the yaw rate signal, and a global pitch attitude.

12. A control system for an automotive vehicle having a vehicle body comprising:
   a suspension height sensor generating a suspension height signal corresponding to the suspension height of the vehicle;
   a longitudinal acceleration sensor generating a longitudinal acceleration signal corresponding to the longitudinal acceleration of the vehicle body; and
   a controller coupled to said suspension height sensor, and said longitudinal acceleration sensor, said controller determining a suspension force in response to said suspension height signal and a control command, said controller determining a pitch angular acceleration from the suspension height signal and the longitudinal acceleration signal.

13. A system as recited in claim 12 wherein said controller generates a suspension velocity signal from said suspension height signal, said controller determining a suspension force in response to said suspension height signal, said suspension velocity signal and a control command.

14. A system as recited in claim 12 further comprising a yaw rate sensor generating a yaw rate signal corresponding to a yaw angular motion of the vehicle body.

15. A system as recited in claim 14 wherein said controller determines a global pitch attitude from the pitch angular acceleration, the yaw rate signal, and a global roll attitude.

16. A system as recited in claim 12 wherein the controller determines a relative pitch attitude in response to said suspension height signal.

17. A system as recited in claim 12 wherein the controller determines a relative pitch attitude in response to said suspension height signal, wherein said controller determines a global pitch attitude from the pitch angular acceleration, a yaw rate signal, and a global roll attitude, and wherein the controller determines a road slope angle in response to the global pitch attitude and the relative pitch attitude.

18. A control system as recited in claim 17 further comprising a safety system coupled to said controller, said controller generating a control signal for said safety system in response to said pitch angular acceleration.

19. A control system as recited in claim 18 wherein said safety system is at least one selected from an active brake control system, an active rear steering system, an active front steering system, an active anti-roll bar system, and an active suspension system.

20. A method of controlling a safety device for an automotive vehicle having a body comprising:
   determining a lateral acceleration of the vehicle body;
   determining a longitudinal acceleration of the vehicle body;
   generating a first angular rate signal corresponding to a first angular rate of the vehicle body;
   generating a suspension height signal corresponding to the suspension height of the vehicle;
   determining a roll characteristic from the first angular rate signal, the suspension height signal, and the lateral acceleration signal;
   determining a pitch characteristic from the first angular rate signal, the suspension height signal and the longitudinal acceleration signal; and
   activating a safety device in response to the pitch characteristic and the roll characteristic.

21. A method as recited in claim 20 wherein activating a safety device comprises activating one selected from the group comprising an active brake control system, an active rear steering system, an active front steering system, an active anti-roll bar system, and an active suspension system.

22. A method as recited in claim 20 wherein generating a suspension height signal comprises measuring four suspension heights at a respective corner of the vehicle and wherein determining a roll characteristic comprises measuring the roll characteristic from the four suspension height signals, and wherein determining a pitch characteristic comprises measuring a pitch characteristic from the four suspension height signals.

23. A method as recited in claim 20 wherein the roll characteristic comprises a relative roll angle.

24. A method as recited in claim 20 wherein the roll characteristic comprises a global roll.

25. A method as recited in claim 20 wherein the pitch characteristic comprises a relative pitch angle.

26. A method as recited in claim 20 wherein the pitch characteristic comprises a global pitch angle.

27. A method as recited in claim 20 wherein said first angular rate signal comprises a yaw rate signal.

28. A method as recited in claim 20 wherein said first angular rate signal comprises a roll rate signal.

29. A method as recited in claim 20 wherein said first angular rate signal comprises a pitch rate signal.

30. A control system for an automotive vehicle having a vehicle body comprising:
   a first angular rate sensor generating a first angular rate signal corresponding to a first angular motion of the vehicle body;
   a suspension height sensor generating a suspension height signal corresponding to the suspension height of the vehicle;
   a lateral acceleration sensor generating a lateral acceleration signal corresponding to a lateral acceleration of the vehicle body; and
   a controller coupled to said first angular rate sensor, said suspension height sensor and said lateral acceleration sensor, said controller determining a roll characteristic from the first angular rate signal, the suspension height signal, and the lateral acceleration signal.

31. A control system for an automotive vehicle having a vehicle body comprising:
   a first angular rate sensor generating a first angular rate signal corresponding to a first angular motion of the vehicle body;
   a suspension height sensor generating a suspension height signal corresponding to the suspension height of the vehicle;
   a longitudinal acceleration sensor generating a longitudinal acceleration signal corresponding to the longitudinal acceleration of the vehicle body; and
   a controller coupled to said first angular rate sensor, said suspension height sensor and said longitudinal acceleration sensor, said controller determining a pitch characteristic from the first angular rate signal, the suspension height signal and the longitudinal acceleration signal.

* * * * *